United States Patent
Perrot

(10) Patent No.: US 12,516,644 B2
(45) Date of Patent: Jan. 6, 2026

(54) PRESSURE DROP ANALYSIS STRATEGY

(71) Applicant: DELPHI TECHNOLOGIES IP LIMITED, Belleville (BB)

(72) Inventor: Baptiste Perrot, Blois (FR)

(73) Assignee: PHINIA DELPHI LUXEMBOURG SARL, Belvaux (LU)

( * ) Notice: Subject to any disclaimer, the term of this patent is extended or adjusted under 35 U.S.C. 154(b) by 0 days.

(21) Appl. No.: 18/690,551

(22) PCT Filed: Sep. 8, 2022

(86) PCT No.: PCT/EP2022/074932
§ 371 (c)(1),
(2) Date: Mar. 8, 2024

(87) PCT Pub. No.: WO2023/036855
PCT Pub. Date: Mar. 16, 2023

(65) Prior Publication Data
US 2025/0137416 A1  May 1, 2025

(30) Foreign Application Priority Data
Sep. 9, 2021 (GB) .................................. 2112891

(51) Int. Cl.
G06G 7/70 (2006.01)
F02D 41/38 (2006.01)
G01M 15/04 (2006.01)

(52) U.S. Cl.
CPC ....... *F02D 41/3836* (2013.01); *G01M 15/042* (2013.01); *F02D 2200/0602* (2013.01)

(58) Field of Classification Search
CPC ..... F02D 2200/0602; F02D 2200/0604; F02D 41/2467; F02D 41/3094; F02D 41/40; F02D 2200/0616
(Continued)

(56) References Cited

U.S. PATENT DOCUMENTS 10,539,108 B2 * 1/2020 Guerrassi ............. F02M 55/025
11,674,471 B2 * 6/2023 Pursifull ............. F02D 41/3094
123/447
(Continued)

FOREIGN PATENT DOCUMENTS

| DE | 102018212669 A1 | 1/2020 |
| DE | 102020205775 A1 | 4/2021 |
| GB | 2533104 A | 6/2016 |

OTHER PUBLICATIONS

International Search Report for PCT/EP2022/074932 dated Dec. 23, 2022, 4 pages.
(Continued)

*Primary Examiner* — Logan M Kraft
*Assistant Examiner* — James J Kim
(74) *Attorney, Agent, or Firm* — WARNER NORCROSS + JUDD LLP

(57) ABSTRACT

A method of operating a fuel injection system of an internal combustion engine comprising at least one fuel injector associated with a combustion chamber and coupled to a fuel rail comprising a pressure sensor. The method comprises applying to the injector a drive signal of predetermined length; and a pressure drop analysis, PDA, strategy is operated, by which an injected fuel quantity corresponding to a given injection event is determined from a mapping based on a rail pressure drop corresponding to the given injection event. Rail pressure data are acquired by the pressure sensor during an analysis window encompassing the given injection event. In the method, the rail pressure data are processed in order to cancel predetermined artefacts of known intensity and timing due to the injection system and intervening in the analysis window, whereby corrected pressure data are obtained; and the PDA strategy is operated
(Continued)

based on a pressure drop calculated from the corrected rail pressure data.

9 Claims, 5 Drawing Sheets

(58) Field of Classification Search
USPC .......................................................... 701/102
See application file for complete search history.

(56) References Cited

U.S. PATENT DOCUMENTS

| | | |
|---|---|---|
| 12,140,102 B2 * | 11/2024 | Peyret-Forcade ....... F02D 41/40 |
| 2009/0164086 A1 | 6/2009 | Geveci et al. |
| 2010/0332363 A1 * | 12/2010 | Duddle .................. G06Q 40/12 |
| | | 705/41 |
| 2015/0159578 A1 | 6/2015 | Surnilla et al. |
| 2019/0003414 A1 | 1/2019 | Nieddu |
| 2020/0291885 A1 * | 9/2020 | Pursifull .............. F02M 65/003 |
| 2021/0156332 A1 | 5/2021 | Albing et al. |

OTHER PUBLICATIONS

Machine assisted English translation of DE102018212669A1 obtained from https://worldwide.espacenet.com/patent on Mar. 7, 2024, 14 pages.
Machine assisted English translation of DE102020205775A1 obtained from https://worldwide.espacenet.com/patent on Mar. 7, 2024, 18 pages.

* cited by examiner

PRESSURE DROP ANALYSIS STRATEGY

CROSS-REFERENCE TO RELATED APPLICATIONS

This application is the U.S. National Stage of International Application No. PCT/EP2022/074932 filed on 8 Sep. 2022, which claims priority to and all advantages of United Kingdom Application No. 2112891.3 filed on 9 Sep. 2021, the contents of which are incorporated herein by reference.

FIELD OF THE INVENTION

The present invention generally relates to fuel injection systems in internal combustion engines and their operation and in particular to a method a method of determining injected fuel quantities known as pressure drop analysis strategy.

BACKGROUND OF THE INVENTION

The contemporary design of internal combustion engines must cope with the increasingly stringent regulations on pollutant emissions. Accordingly, automotive engineers strive for designing engines with low fuel consumption and low emissions of pollutants, which implies including electronic devices capable of monitoring the combustion performance and emissions in the exhaust gases.

A proper operation of a fuel-injected engine requires that the fuel injectors and their controller allow for a timely, precise and reliable fuel injection. Indeed, it is well known that problems arise when the performance, or more particularly the timing, and the quantity of fuel delivered by the injectors diverge beyond acceptable limits. For example, injector performance deviation or variability will cause different torques to be generated between cylinders due to unequal fuel quantities being injected, or from the relative timing of such fuel injection.

As it is known, fuel injectors are typically controlled by generating pulses which are sent to the actuators of the fuel injectors. The amount of fuel injected depends on the length of the pulse sent to the actuator. Typically, an Engine Control Unit adjusts the pulse length as a result of the demand quantity of fuel to be injected. The demand quantity of fuel is typically stored in a map which relates this to engine speed and torque demand.

Characteristics of fuel injectors may vary, as well as change over time for the same fuel injector, e.g. as a result of wear. It is important to calibrate the injection systems/injectors periodically so that variations in their lifetime are catered for, and that the control is adapted to deal with such variations. Techniques are known which apply learning strategies, whereby injector characteristics are freshly determined, and the injectors are consequently appropriately controlled.

A parameter of interest in this context is the injected fuel quantity.

The determination of injected fuel quantity can be realized by so-called Pressure Drop Analysis (PDA), which is disclosed in GB 2533104 A. The PDA strategy is based on a relationship between a pressure drop in the fuel rail (common rail/accumulator) consequently to an injection event and the corresponding injected fuel quantity. A map is thus built to calibrate pressure drop vs. injected quantity, and this map is used during engine operation to determine the injected fuel quantity based on the pressure drop measured by means of a pressure sensor arranged on the fuel rail.

The conventional PDA strategy works satisfactorily, but it is based on perfect condition for estimation. For best performance, the pressure signal should describe a long flat high-pressure level, followed by a linear pressure drop and finishing with a long flat low-pressure level. Unfortunately, the pressure signal tend to vary on both sides of the pressure drop.

OBJECT OF THE INVENTION

The object of the present invention is to provide an improved approach for implementing a PDA strategy.

This object is achieved by a method as claimed in claim 1.

SUMMARY OF THE INVENTION

The present invention derives from the present inventor's finding that the pressure signal measured by the pressure sensor mounted on the fuel rail may be affected by various events unrelated to the injection event currently monitored for the purpose of pressure drop analysis (PDA) strategy.

According to the invention, a method of operating a fuel injection system of an internal combustion engine is proposed, the engine comprising at least one fuel injector associated with a combustion chamber and coupled to a fuel rail comprising a pressure sensor. Injection events are performed by applying to the injector a drive signal of predetermined length (duration); and a PDA strategy is operated, by which an injected fuel quantity corresponding to a given injection event is determined from a mapping based on a rail pressure drop corresponding to the given injection event. Rail pressure data are acquired by the pressure sensor during an analysis window encompassing the given injection event.

It will be appreciated that the rail pressure data are processed in order to cancel predetermined artefacts of known intensity and timing due to the injection system and intervening in the analysis window, whereby corrected pressure data are obtained; and the PDA strategy is operated based on a pressure drop calculated from the corrected rail pressure data.

As used herein, 'injection event' (which may also be referred to as 'injector event') refers to a selective opening of the fuel injector, consequential to an electric command pulse applied to the fuel injector. The electric timing of the command pulse being known, the acquisition window is predefined/calibrated to encompass the pressure drop, i.e. acquire pressure data before and after the pressure drop by means of the rail pressure sensor.

The inventive method permits correcting the raw rail pressure data by suppressing pressure variations extraneous to the observed fuel injection event, and thus provides corrected rail pressure data based on which the PDA strategy is implemented with an improved accuracy. This method can be used with different engine technologies like gasoline direct injection (GDi), Diesel, natural gas (CNG) or hydrogen ($H_2$).

A rail pressure sensor is always available on a common rail system whatever the fuel type, and is typically used for the PDA strategy.

In the context of the invention 'cancelling' predetermined artefacts means removing the effects related to the artefacts from the raw pressure data. Any data processing or mathematical approach can be used to cancel (or suppress or remove) the artefacts from the raw pressure data. One way of doing it is to subtract the modelized/theoretic pressure values corresponding to the respective artefacts from the raw rail pressure data. Where the modelized artefact describes a decrease in pressure, the resulting corrected rail pressure data will increase. And conversely where the modelized artefact describes an increase in pressure, this will result in a corresponding decrease in pressure in the corrected rail pressure data.

Conventionally the PDA strategy works doing a rail pressure sensor acquisition, determining from the measured pressure data the pressure before an injection (Pmax) and the pressure after an injection event (Pmin). The difference between the two pressures Pmax and Pmin is referred to as ΔP. This ΔP is compared to maps (generally depending on fuel type, temperature, injector type, system pressure) that relate ΔP to the injected fuel quantity. In the inventive method, Pmax and Pmin, and hence ΔP, are determined from the corrected rail pressure data. Pmax and Pmin may typically represent average pressures over a predetermined time period before and after the injection event.

The term 'artefacts' (or artifact) herein refers to observed pressure variations due to operation of the fuel injection system but not related to the injection event currently under analysis. Indeed, events that occur before or after the pressure drop related to the injection event to be processed by the PDA strategy and intervening in the corresponding analysis window will have an impact on the measured pressure. Such pressure variations, i.e. the artefacts, may in particular be due to pumping events (pumping by the high-pressure fuel pump to regulate the pressure in the fuel rail) and injection events (intervening in the same cylinder, as e.g. a pilot injection or more generally multi-injection, or in another cylinder). In this context, the term 'external' is used to designate such intervening injector events not corresponding to the injection event to be analyzed by the PDA strategy.

As it will be known to those skilled in the art, the effects on pressure of injector artefacts and pumping artefacts, and in particular their amplitude/intensity and timing can be determined (calculated or retrieved) by the ECU.

Regarding injector events, their timing and desired injection quantity, whereby based on these parameters a corresponding theoretic pressure drop can be computed.

Regarding pumping events, the pumping volume is known, and the pumping start and end timings can be calculated, as well as pumping angle length, whereby based on these parameters a theoretical pressure increase can be computed.

These theoretical pressure variations occur during a certain period of time and, based on the above-mentioned parameters, models describing the pressure increase/decrease profile over time can be computed.

In embodiments, the predetermined artefacts include external injector events and pumping events falling in the analysis window of the PDA strategy for the relevant injector event.

In embodiments, the pressure drop model is based on the slope parameter as well as on a maximum pressure, Pmax, and on a minimum pressure, Pmin, corresponding respectively to fuel rail pressures before and after the injection event.

The present method may typically be implemented by software (program code/instructions) implemented by a computer, such as an engine control unit.

According to another aspect, the invention relates to computer program as claimed in claim 8.

According to another aspect, the invention further relates to a control system configured for operating a fuel injection system of an internal combustion engine as claimed in claim 9.

BRIEF DESCRIPTION OF THE DRAWINGS

The present invention will now be described, by way of example, with reference to the accompanying drawings, in which.

DETAILED DESCRIPTION OF PREFERRED EMBODIMENTS

Figure 1:
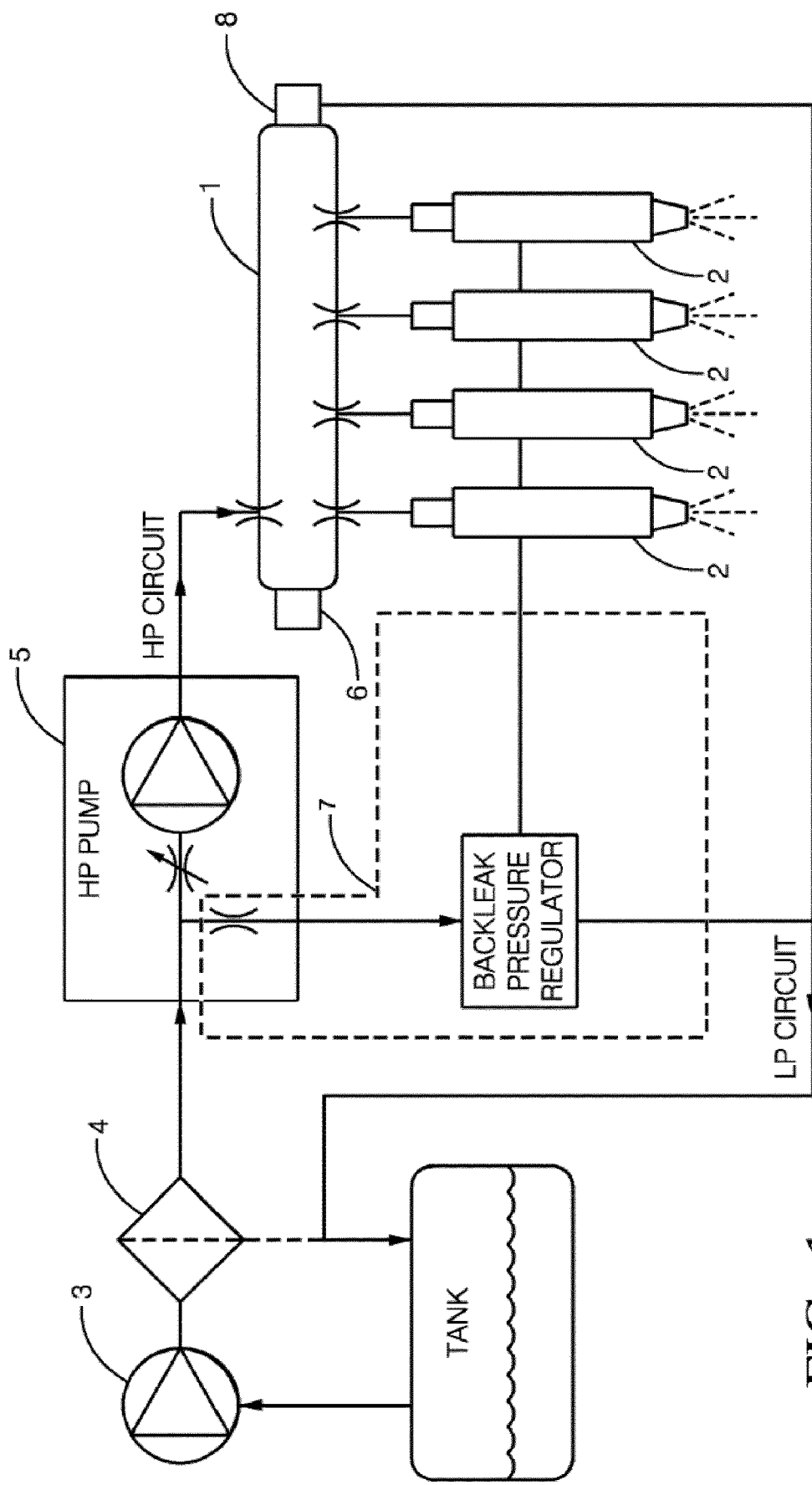
FIG. 1: is a principle diagram of a known fuel injection circuit for an internal combustion engine.

FIG. 1 is a principle diagram of a known fuel injection system as commonly used in an internal combustion engine. It comprises a common fuel rail 1 (or accumulator) fluidly connecting the fuel therein to a series of injectors 2 (e.g. of solenoid actuated fuel injectors). The circuit typically includes an in-tank electrical fuel pump 3, a fuel filter 4, and a high-pressure pump 5. A high-pressure sensor 6 is located on the common rail 1 as shown in order to measure the fuel pressure inside the common rail 1. A high-pressure valve 8 is provided on the common rail 1, which is a safety valve that opens when the pressure exceeds a preset value (typically passive in gasoline engines but can be controlled, e.g. in diesel systems). Reference sign 7 indicates a backleak circuit including a backleak regulator and injector return line, which is typically present in diesel fuel injection systems. Such backleak circuit 7 is typically used for indirectly controlled fuel injectors (Diesel injectors include a solenoid-controlled valve that hydraulically controls the needle), but is not required for injectors where the pintle is directly controlled via the solenoid. Hence, the backleak circuit 7 is usually not present on gasoline, GDi, CNG or H2 systems.

Figure 2:
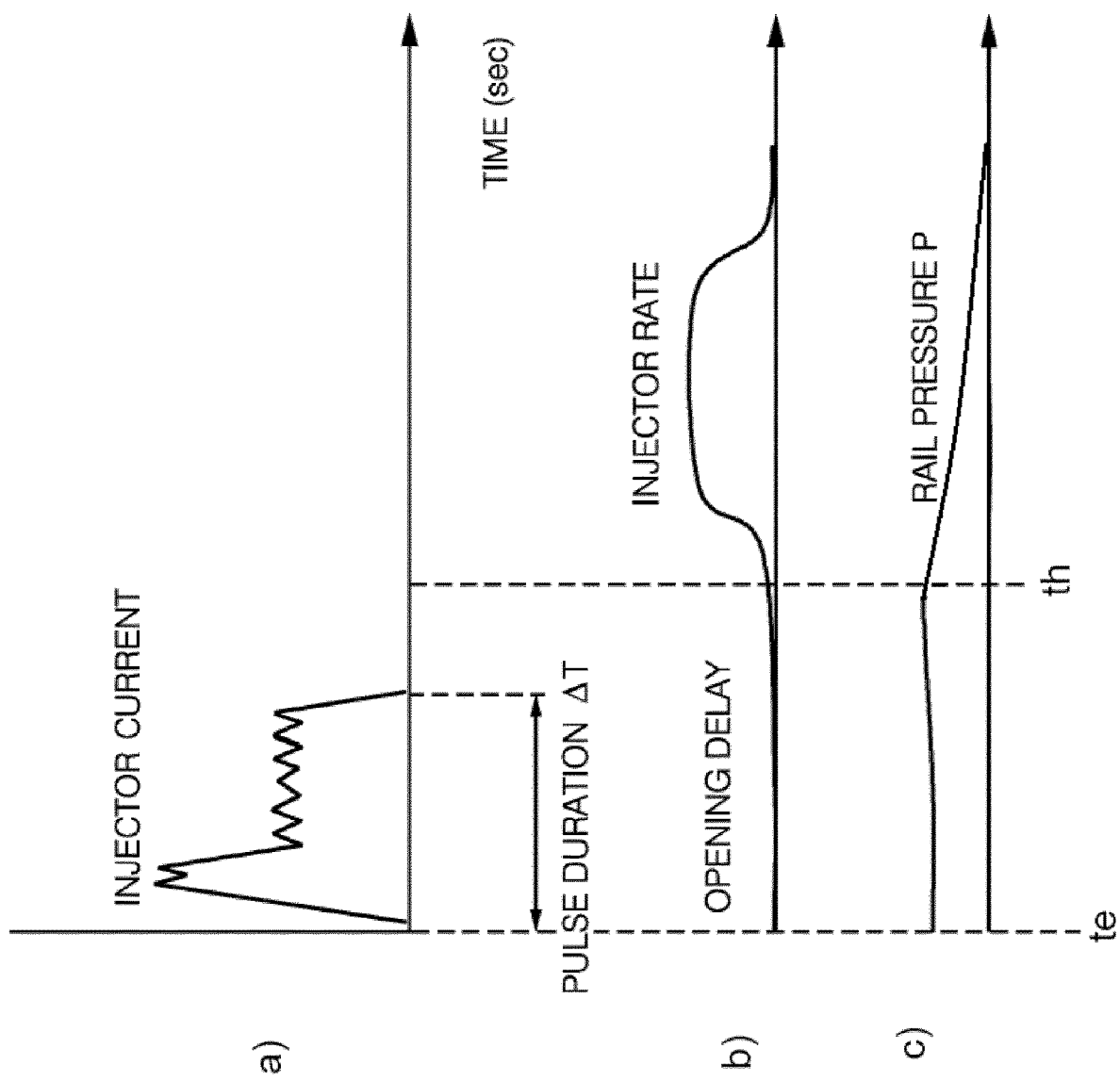
FIG. 2: shows graphs of (a) injector current; (b) injector needle lift-off; and (c) rail pressure in function of time for an injection event.

FIG. 2 shows several well-known graphs related to an injection event. The first two graphs (a and b) illustrate the delayed response of the injector following the electrical command. FIG. 2a shows typically the current through the actuator of a fuel injector 2 as a result of an actuation pulse of duration ΔT sent from the ECU. The timing of this actuation pulse (i.e. electric command pulse) is typically determined by the Engine Control Unit, which adjusts the pulse length as a result of the demand quantity of fuel to be injected. The demand quantity of fuel is typically stored in a map which relates this to engine speed and torque demand.

FIG. 2b shows the actuator needle lift, which defines the actual volume of fuel dispensed over time. As can be seen, there is a delay between the start of the electric pulse and the opening of the actuator valve to dispense fuel, currently referred to as 'opening delay'. Reference $t_e$ indicates the electric timing of injection, i.e. the start of the electrical pulse. Time $t_h$ correspond to the moment when the injector starts opening (needle lifts-off from seat) and hence fuel start flowing into the combustion chamber. This time $t_h$ is referred to as hydraulic timing of the injector and thus represents the actual time of the injection event at which fuel started to flow through injector.

FIG. 2c shows the pressure in the common rail consequent to the injection event. As can be seen, opening of the injector 2 due to an applied drive pulse is delayed and causes a pressure drop at a time essentially corresponding to the hydraulic timing of injection.

The possibility of relating the fuel pressure drop in the fuel rail consequential to an injection event with the injected quantity is disclosed in GB 2533104 A and known as Pressure Drop Analysis (PDA).

Figure 3:
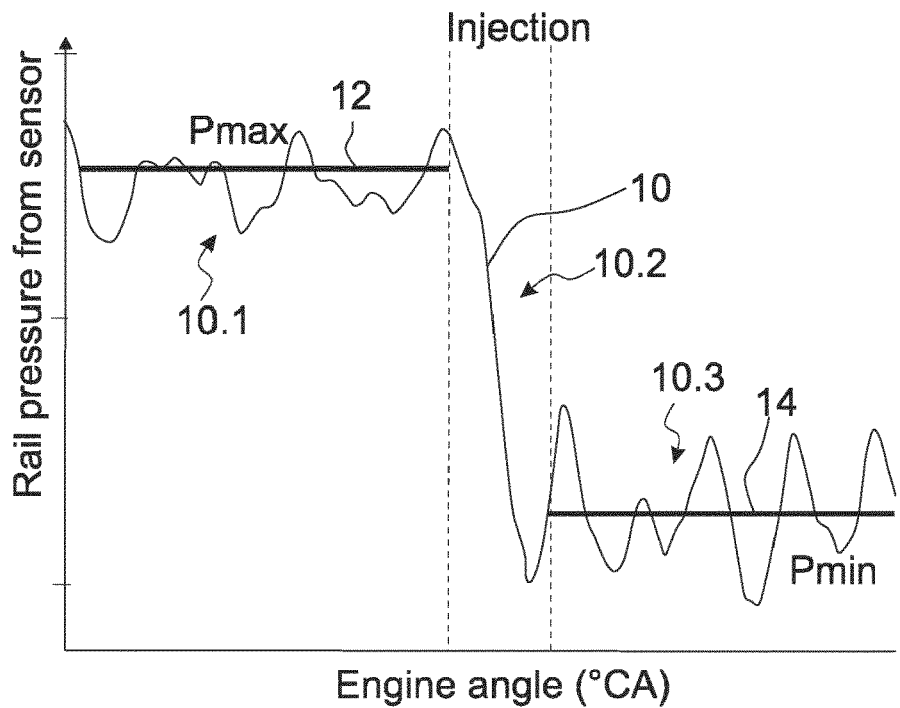
FIG. 3: is a graph showing the rail pressure vs. time for an injection event.

The implementation of PDA strategy is generally done by determining the pressures before (Pmax) and after (Pmin) the injection event. The PDA strategy is a function that is programmed in the ECU or other control unit. The pressure within the fuel rail 1 varies a lot due to several factors and conventional PDA strategies calculate the average pressure on both sides of the pressure drop. This is illustrated in FIG. 3 where line 10 represents the measured pressure vs. time (here expressed as engine angle—degrees of crank angle) over a given acquisition window. The size of the acquisition window, referred to as analysis window, is generally predetermined to encompass a certain time period before and after the expected injection event (the electric timing of which is known). As can be seen, the pressure trace 10 mainly comprises three sections. A first section 10.1 in the higher-pressure range, a second section 10.2 describing a sharp decreasing line down to a third section 10.3 in the lower pressure range. The pressure drop illustrated by section 10.2 is due to fuel leaving the fuel rail 1 and flowing through the injector 2, and is characteristic of the injection system and opening duration.

The PDA strategy will calculate the average pressure Pmax, indicated by line 12, before the injection, as well as the average pressure Pmin, at the end of the injection event, as indicated by line 14. The difference between Pmax and Pmin is noted ΔP.

The PDA strategy conventionally uses a calibrated relationship between ΔP and injected fuel quantity, which is typically stored in a map MAP–ΔP also normally depending on fuel type, temperature, injector type and system pressure.

The conventional PDA strategy works satisfactorily, but it is based on perfect condition for estimation. For best performance, the pressure signal should describe a long flat high-pressure level, followed by a linear pressure drop and finishing with a long flat low-pressure level. Unfortunately, as seen in FIG. 3, the pressure signal varies on both sides of the pressure drop.

As a matter of fact, external events affect the fuel pressure inside the fuel rail and are thus measured by the rail pressure sensor 6:

- many waves may be present (mainly at very high pressure, as in diesel common rail systems), leading to an oscillating pressure signal instead of a long flat signal
- Other non-desired pressure drops may be due to multi-injections schemes on the same cylinder (diesel and gasoline engines);
- Other non-desired pressure drops may be due to injection overlap between cylinders, e.g. in diesel engine (post injection) and mainly gasoline engine with long range injection (up to 360 deg before top dead center)
- Other non-desired pressure increases due to pumping events, seen on diesel engine (fixed synchronization with TDC or asynchronization), and gasoline engine (variable synchronization with TDC depending on CAM phaser)

All these external events affecting the pressure trace lead to a poor fuel estimation or, in extreme cases, lead to an impossible fuel estimation with the conventional PDA strategy.

Inventive Method

The present method provides an approach that allows improving the performance of the PDA strategy. The present method can be implemented with existing equipment, namely the pressure sensor 6, and using available information, namely Pmax and Pmin, as well as the existing PDA strategy.

It will be appreciated that the present method provides a way of processing the rail pressure data obtained by pressure sensor 6, referred to as raw rail pressure data, in such a way that artefacts are removed and corrected rail pressure data are obtained. Based on these corrected rail pressure data, the PDA strategy can be operated with improved accuracy.

It may be noted that during rail pressure acquisition, all the injection parameters of the engine and pumping parameters are known. It is thus possible to know when the injections occur and when pumping is present.

The external injection parameters and pumping parameters corresponding to these artefacts can be modelized knowing theorical quantity/amplitude and timing/duration. As will be seen below, the model used in the present embodiment are based on the related injection or pumping parameters and describe a profile of pressure increase or decrease over time.

The present method thus proposes an approach wherein the problem of poor fuel estimation by PDA is solved by means of "signal noise cancellation", avoiding intrusive method. Specifically, artefacts of known amplitude and timing, such as pumping and other injection events, will be cancelled from the raw pressure signal/trace/data to have a cleaner signal (corrected rail pressure data) for PDA analysis.

The cancellation can generally be seen as a way of removing the contribution of the artefact to the raw pressure data. This can be e.g. done by subtracting the artefact model from the raw pressure data, which may be written as:

$$P\text{corr} = P\text{raw} - P\text{mod}$$

Where Pcorr is the corrected pressure, Praw is the raw pressure and Pmod is the modelized pressure. This calculation can be applied to each sample/measured point of the raw pressure data.

A—Injection Event Cancellation

Figure 4:
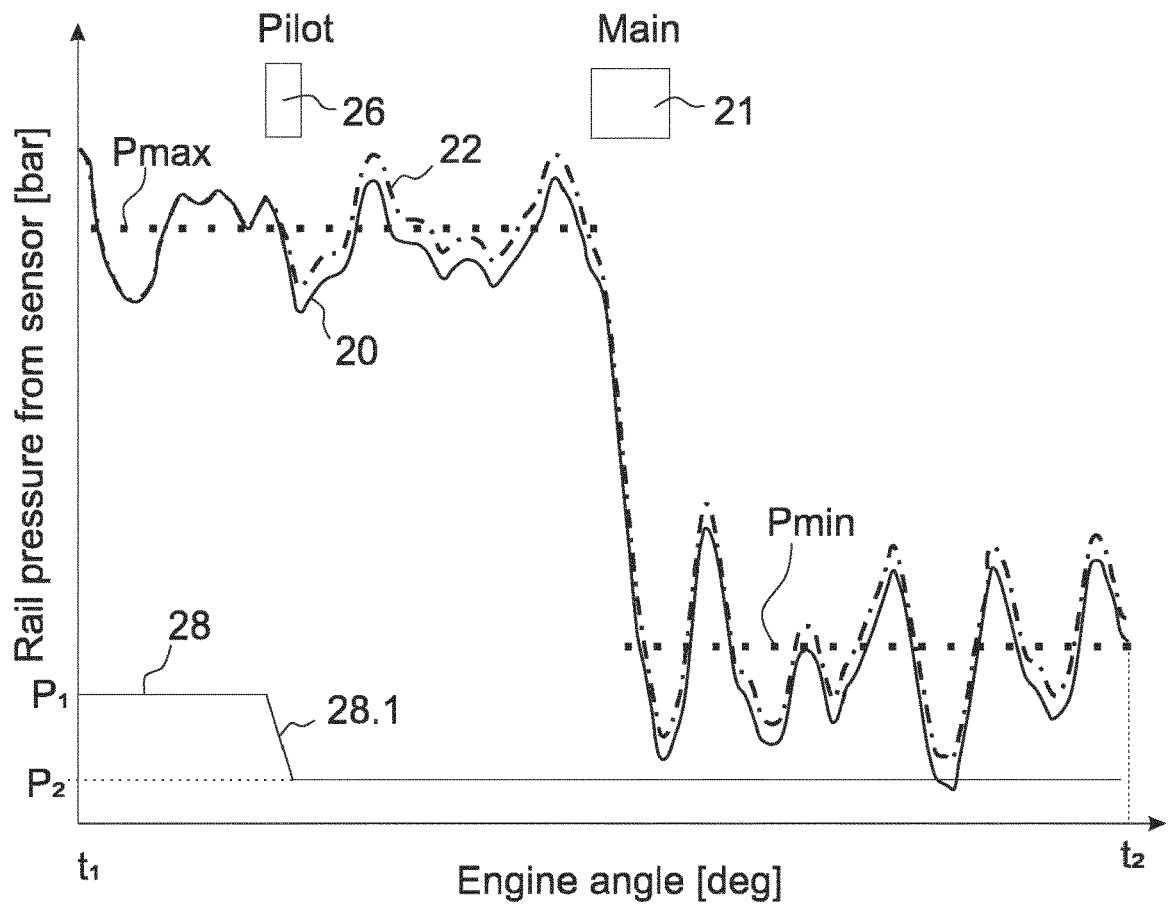
FIGS. 4 and 5: are graphs illustrating the raw rail pressure and corrected rail pressure versus engine angle for a given injection events.

Referring to FIG. 4, the solid line 20 represents the raw rail pressure signal over the analysis window corresponding to the injection event of interest (noted Main 21), whereas the mixed line 22 represents the corrected rail pressure, i.e. the resulting pressure trace upon treatment according to the present method.

As will be recognized, the fuel pressure before and after the main injection is oscillating. For the PDA analysis, the pressure data are analyzed over a certain analysis window encompassing the main injection. The analysis window is here noted $W_A$ and corresponds to the time interval [t1; t2].

Another injector event may e.g. occur during signal acquisition over the analysis window $W_A$ related to the main injection, either from the same injector (multi pulse) or coming from another injector/cylinder (overlap). In both cases, the ECU knows the injection parameters, namely timing and duration (pulse width) and demand fuel quantity.

In the example of FIG. 4, a pilot injection event, indicated 26, is performed in the same cylinder by the same injector, and falls in the acquisition window $W_A$ of the main injection event. This pilot injection 26—occurring just before the main injection 21—impacts the raw rail pressure trace 20 and then the high-pressure level determination, which is typically an average of the rail pressure on the high pressure side of the pressure trace (i.e. before the pressure drop).

Knowing injection quantity and timing, a theorical pressure drop (due to this not-desired injection for PDA) profile corresponding to the pilot 26, can be determined using reverse value of the mapping MAP–ΔP, establishing the relationship between pressure drop and injected fuel quantity.

Knowing the parameters of this injection related artefact, a model of the artefact can be defined and used to cancel the artefact contribution from the raw pressure data. This model is indicated by line 28, which describes a theoretic pressure drop 28.1 (pressure decreasing from P1 to P2) at the timing of Pilot 26.

Based on this injection model 28, the raw rail pressure trace 20 is modified to cancel the effects of the pilot injection 26, by removing the modelized pressure drop corresponding to the pilot injection. The resulting, corrected rail pressure data are represented by mixed line 22. From the pilot timing, the mixed line representing corrected rail pressures is somewhat higher than the raw signal 20, since the raw signal is corrected to compensate the pressure drop induced by the pilot injection.

The PDA strategy can then be operated based on the corrected rail pressure data, allowing an improved result of injected fuel quantity. In particular, the determination of the average pressures before and after the pressure drop (Pmax and Pmin) is then based on the corrected pressure data 22, hence improving the accuracy of the PDA strategy.

The above described correction can be carried out in case of multi-injection (same injector/cylinder) or in case of injection overlap (injection by another injector in another cylinder), before or after the pressure drop that the PDA strategy is to analyze. The present method can be applied with several injection events occurring within the same analysis window $W_A$.

B—Pumping Event Cancellation

Another possible event that may occur during signal acquisition (window $W_A$) is a pumping event, potentially leading to a significant rail pressure increase. The greater the injection quantity, the greater the pumping length. The ECU knows the pumping parameters because it is controlled by Rail Pressure Control (RPC).

Figure 5:
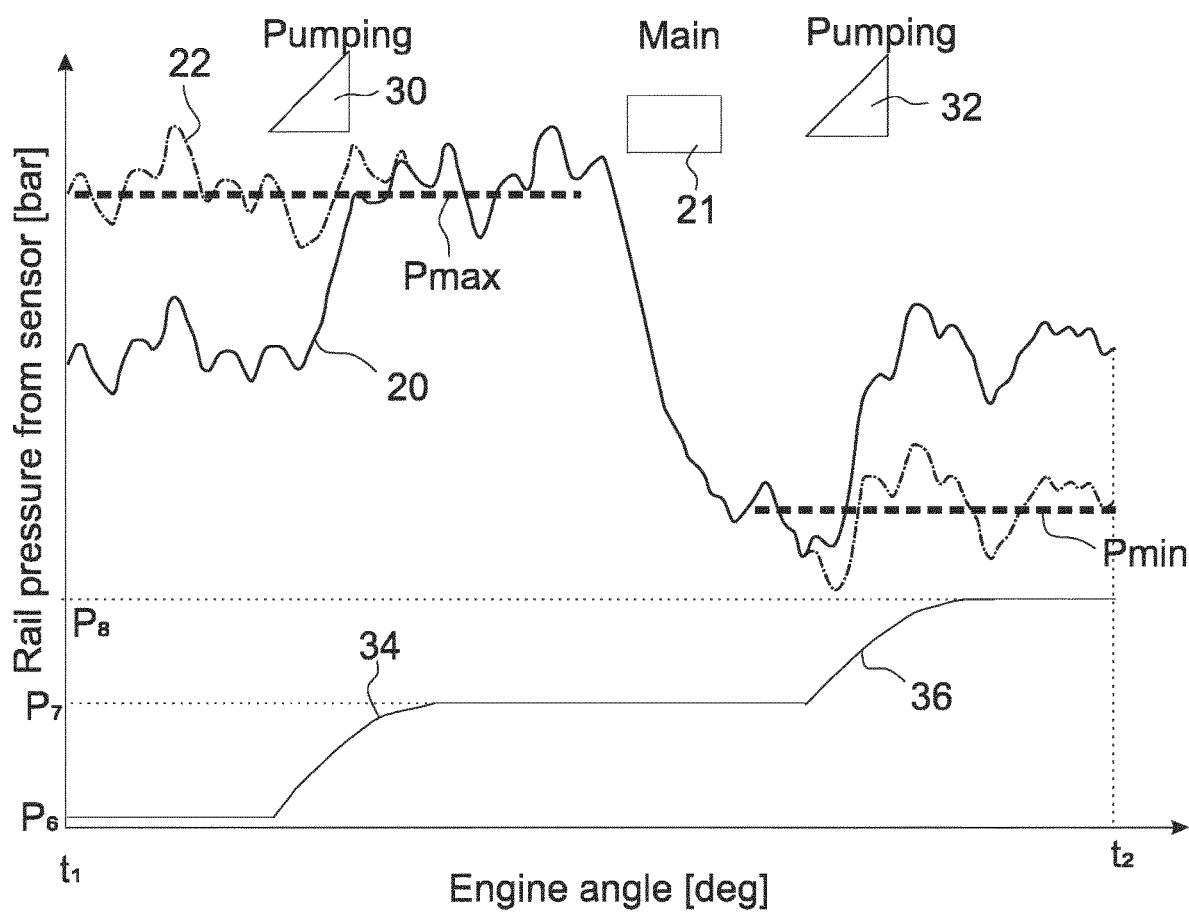

Referring to FIG. 5, line 20 indicates a raw pressure trace over an analysis window $W_A$ (interval [t1; t2]) corresponding to the main injection event 21. Two pumping events are indicated 30 and 32. Mixed line 22 represents the corrected pressure data upon treatment of the raw pressure data by the present method.

According to the present method, the raw pressure data are corrected by cancelling the effects of pumping on the rail pressure.

The parameters related to pumping event (artefact) can be determined (retrieved and/or calculated) by the ECU. The pumping volume is known (fuel quantity and leaks), and, based on pump CAM profile, the start of pumping angle can be determined. The end of pumping angle is also known and may vary in case of CAM phaser (mainly on gasoline engines).

Knowing pumping angle length, and based on pumping CAM profile, the theorical pressure increase (due to pumping event) profile can be determined using reverse value of the table MAP–ΔP.

In the example of FIG. 5, the PDA strategy is set to analyze the fuel quantity for the pressure drop due to the main injection 21. However, two pumping events 30 and 32 occur over $W_A$ just before and after the pressure drop, impacting the raw rail pressure trace, and the determination of High pressure level and Low pressure level.

According to present method, the ECU computes, for each known pumping event 30, 32, a pumping model based on pumping parameters, indicated 34 and 36 respectively. As can be seen, the first model 30 describes a pressure increase from pressure P6 to P7, then the second model describes a pressure increase from pressure P7 to P8.

Based on the pumping models, the raw rail pressure data are processed to cancel the pumping events, removing theorical pressure increases (the models) due to the pump.

C—Overview of Method

Figure 6:
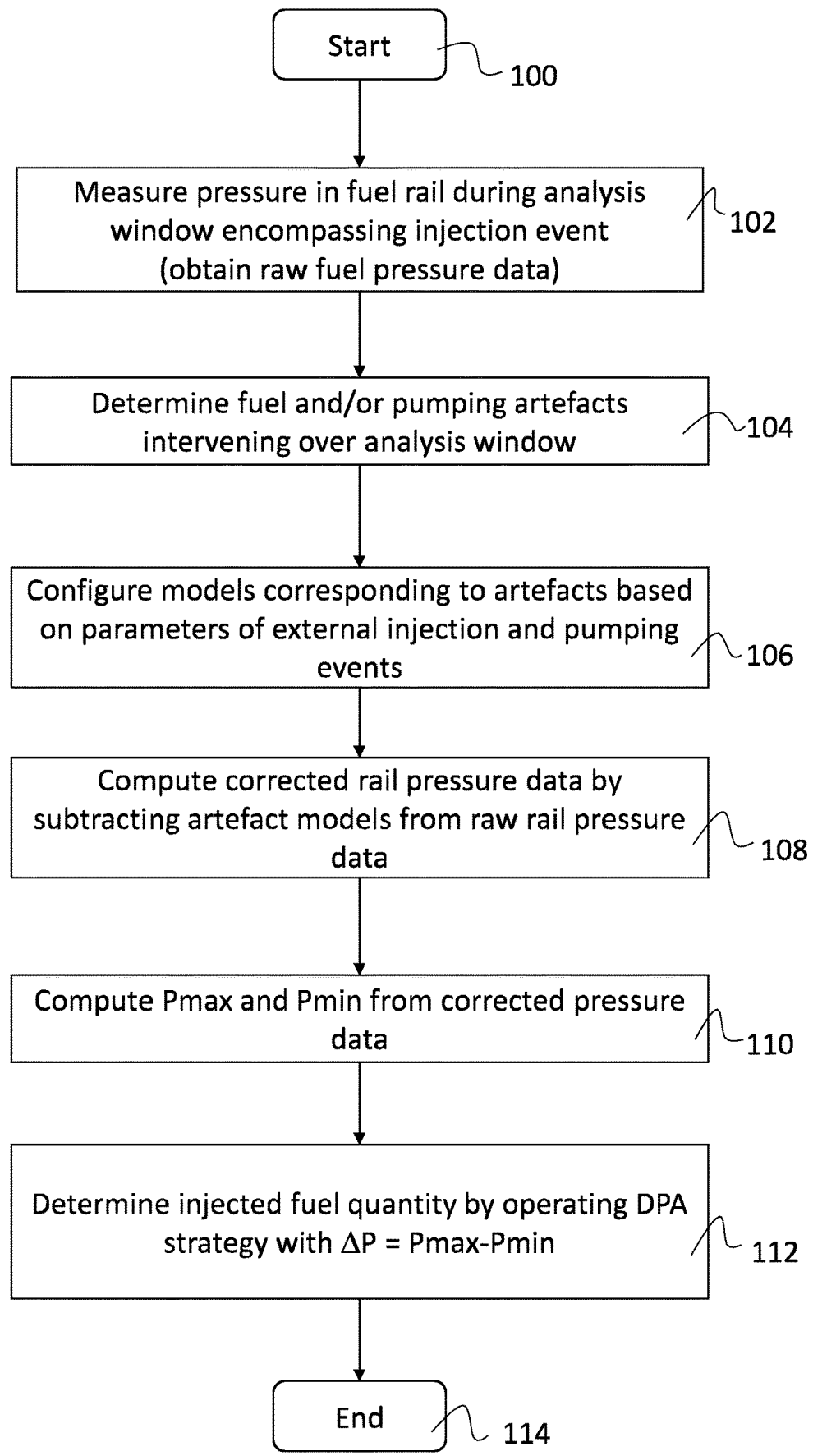
FIG. 6: is a flowchart illustrating an embodiment of the present method.

Turning now to FIG. 6, the illustrated flowchart gives an overview of the main steps of the present method. This embodiment starts at 100 and begins at 102 with acquiring pressure data by means of pressure sensor for a given fuel injection event.

At 104, the ECU determines the various artefacts that have occurred during the analysis windows. Here, the ECU looks up from a scheduler or table or any appropriate memory, which external injector events or pumping events have occurred during the analysis window, i.e. the artefacts. Step 104 may occur after step 102 or in parallel.

Based on this determination, at 106, the ECU configures (initializes/computes) models corresponding to the external injection events and pumping events that are present in the analysis window.

The raw rail pressure data are then processed to cancel the artefacts, box 108. The general principle is to remove/subtract the computed models from the raw rail pressure data, whereby corrected rail pressure data are obtained (corresponding to the analysis window). The pressure variations due to the artefacts are thus eliminated from the measured pressures.

The corrected rail pressure data are then used for the purpose of the PDA strategy, box 110, the maximum and minimum pressure before and after the pressure drop being determined as average values.

According to the PDA strategy, at 112, the pressure drop ΔP is then used to look-up the injected fuel quantity from the PDA mapping MAP–ΔP. The methods ends at 114.

The invention claimed is:

1. A method of operating a fuel injection system of an internal combustion engine comprising at least one fuel injector associated with a combustion chamber and coupled to a fuel rail comprising a pressure sensor,
   wherein injection events are performed by applying to said injector a drive signal of predetermined length; and a pressure drop analysis, PDA, strategy is operated, by which an injected fuel quantity corresponding to a given injection event is determined from a mapping based on a rail pressure drop corresponding to said given injection event;
   wherein rail pressure data are acquired by said pressure sensor during an analysis window encompassing the given injection event;
   wherein the rail pressure data are processed in order to cancel predetermined artefacts of known intensity and timing due to the injection system and intervening in the analysis window, whereby corrected pressure data are obtained; and wherein the PDA strategy is operated based on a pressure drop calculated from the corrected rail pressure data;

wherein the predetermined artefacts include external injector events and pumping events falling in the analysis window of the PDA strategy for the relevant injector event;

wherein models describing the pressure profile of the intervening external injector events and pumping events are computed based on respective injector parameters and pumping parameters that are retrieved from control unit(s);

wherein these models are used for correcting the raw rail pressure data;

wherein the corrected rail pressure data are obtained by subtracting, from the raw pressure data, said models corresponding to artefacts intervening in the analysis window.

2. The method according to claim 1, wherein the predetermined artefacts include external injector events due to one of multi-injection strategies on the same cylinder or injection events on other cylinders.

3. The method according to claim 1, wherein models corresponding to injector events are computed to reflect a theoretic pressure decrease from injector event parameters comprising timing, and desired injection quantity.

4. The method according to claim 1, wherein models corresponding to pumping events are computed to reflect a theoretical pressure increase from pumping event parameters comprising pumping volume, pumping start and end timings, and pumping angle length.

5. The method according to claim 1, wherein said PDA strategy uses a relationship between a rail pressure drop and injected fuel quantity, which is typically stored in a mapping, preferably depending on at least one of fuel type, temperature, injector type and system pressure.

6. The method according to claim 1, wherein a high-pressure level, Pmax, and a low-pressure level, Pmin, respectively before and after the pressure drop related to the given injector event are determined from the corrected rail pressure data, and the pressure drop is determined as Pmax−Pmin.

7. The method according to claim 6, wherein Pmax and Pmin are average pressures.

8. A computer program comprising instructions which, when the program is executed by a computer, cause the computer to carry out the method of claim 1.

9. A control system configured for operating a fuel injection system of an internal combustion engine comprising at least one fuel injector associated with a combustion chamber and coupled to a fuel rail comprising a pressure sensor, said control system comprising a plurality of function modules which, when executed by the control system, perform the steps of the method according to claim 1.

* * * * *